Sept. 29, 1953

F. H. McINTOSH 2,654,058

WIDE BAND TRANSFORMER

Filed Dec. 22, 1948

3 Sheets-Sheet 1

INVENTOR.
FRANK H. McINTOSH
BY
Hyman Hurwitz

Sept. 29, 1953 F. H. McINTOSH 2,654,058

WIDE BAND TRANSFORMER

Filed Dec. 22, 1948

3 Sheets-Sheet 2

INVENTOR.

FRANK H. McINTOSH

BY

Hyman Hurwitz

INVENTOR.
FRANK H. McINTOSH
BY
Hyman Hurwitz

Patented Sept. 29, 1953

2,654,058

UNITED STATES PATENT OFFICE 2,654,058

WIDE BAND TRANSFORMER

Frank H. McIntosh, Chevy Chase, Md.

Application December 22, 1948, Serial No. 66,744

6 Claims. (Cl. 317—220)

This application was filed concurrently with my application Serial #66,741, now Patent #2,477,074, issued July 26, 1949, and entitled "Wide Band Amplifier Coupling Circuits," and contains the same disclosure as the latter.

The present invention relates generally to wide band transformers for push-pull amplifiers, especially of the bi-filar type.

The class B amplifier is a push-pull amplifier in which the tubes are biased approximately to cut-off. One of the tubes, in the normal system, amplifies the positive half cycles of the signal voltage while the other amplifies the negative half cycles, the output transformer combining the outputs of the two tubes, to reconstruct a replica of the signal voltage.

The frequency limits of the conventional audio or video amplifier depend largely upon the design of the output transformer, loss in amplification at low frequencies resulting from the low incremental inductance of the transformer primary at low frequencies, and falling off at high frequencies resulting from leakage inductance and the various distributed capacities of the transformer.

In order to obtain a good low frequency response the incremental primary inductance of the transformer must be high relative to the plate resistances of the tubes used. The primary winding of the transformer, then, should have a large number of turns. At the same time the resonant frequency of the transformer leakage inductance and secondary capacitance must be beyond the highest frequency desired to be amplified, so that low leakage inductance and shunt capacity is essential, if the frequency response of the transformer is to be extended.

The above requirements are mutually conflicting, in various respects. The size of the core of a transformer, i. e., the total iron utilized, is limited by considerations of cost, space and weight requirements. This in turn fixes the total number of turns allotted to the primary and secondary windings. Decreasing core size increasing total turns on the primary winding to retain high primary incremental inductance increases leakage inductance and shunt capacity, which in turn, reduces resonant frequency, and hence the high frequency response of the transformer. In practice, leakage inductance is decreased by inter-leaving primary and secondary windings, but this increases distributed capacity and so tends to neutralize the benefits obtained.

As a further consideration, high permeability cores must be used, to increase primary winding impedance. Such cores are adversely affected, in respect to the incremental inductance, by D. C. magnetization. Hence the latter must be avoided.

The effect of leakage inductance on class B push-pull amplifiers has been considered in the literature, and attention is directed particularly to an article by A. Pen-Tung Sah, in Proceedings of the I. R. E. for November 1936. Sah points out particularly the deleterious effects of leakage inductance between primary windings of the output transformer of such an amplifier, first, in causing a decreased output, as frequency increases, and second, in introducing finite time constants into the circuit, thus causing transients which distort the output wave as one of the tubes changes from a conducting condition to a blocking condition, and vice-versa. The latter effect is the basis of great distortion at the higher audio frequencies.

It is an object of the invention to provide novel push-pull transformers having negligible leakage reactance.

It is a further object of the invention to provide a push-pull wide band transformer of relatively simple and economical construction, which eliminates leakage inductance between primary windings of the transformer.

It is another object of the invention to provide an improved push-pull transformer comprising bi-filar primary windings, and further to provide push-pull audio amplifiers capable of employing transformers having bi-filar primary windings.

It is, further, an object of the invention to provide a push-pull transformer, having greater coupling between the secondary winding and the primary windings than is available in known designs, thereby to improve the frequency response and to enlarge the band width of such transformers when employed in amplifiers.

It is still another object of the invention to provide a push-pull transformer having radically reduced effective distributed capacity across the primary windings, and to provide a push-pull amplifier for effectively utilizing a transformer of this character.

It is a further object of the invention to provide a push-pull transformer of reduced distributed capacity and leakage inductance between primary and secondary windings.

Briefly described, the various embodiments of the present invention hereinafter described in detail, and illustrated in the drawings, attain the objects of the invention by employing bi-filar primary windings in the output transformers to reduce to a negligible value the leakage inductance between these windings. The effect of substantially eliminating leakage inductance between primary windings is radically to reduce transients during cross-over from one to another of the tubes of a push-pull amplifier, these transients being particularly severe in class B operation. Leakage inductance between the primary windings and the secondary likewise contributes to these transient effects, but in reduced degree. Relating the primary windings in the manner stated inherently enables reduction of leakage inductance between primary windings and the secondary winding.

By proper arrangement and connection of the primary windings in the transformer the equivalent shunt capacity across the primary windings, due to the capacity between windings, which together with leakage reactance and the capacity of the secondary winding determine falling off of response at the higher audio frequencies and the high frequency cut-off point of the amplifier, may be similarly reduced, and the windings may be so related to the electronic tubes of the amplifier that but a single anode power supply is required, and that in certain of the embodiments conventional input circuits may be employed.

The conventional mode of reducing leakage inductance consists of sectionalizing primary and secondary windings and inter-leaving or interspersing these. This type of construction is expensive, and while it succeeds in reducing leakage inductance, results in increased capacities. The total capacity of the transformer windings may be reduced by avoiding the necessity for inter-leaving or pi-winding, in accordance with the present invention, in order to reduce leakage inductance. By avoiding the necessity for pi-winding, or inter-leaving, furthermore, the transformer may be arranged more compactly, resulting in reduction of iron requirements, and in a simplified, more economically fabricated core and winding structure.

In the conventional push-pull output transformer for class B amplifiers the primary windings of the transformer are connected in series between the plates of the electronic tubes of the amplifier. Accordingly, the primary windings being closely coupled, the total impedance of the primary windings is approximately four times the impedance of a single primary winding. In accordance with certain embodiments of the present invention the primary windings of the output transformer are not connected in series with each other between the amplifier tubes, but are connected effectively in parallel. Thereby a reduction in anode terminal to anode terminal impedance by a factor of four, approximately, may be attained. Additionally, each coil, by reason of its bi-filar relation to another coil, is for the same length of wire and length of coil of double the number of layers, resulting in a further decrease of shunt capacity. Reduction of anode to anode impedance of the windings, is, therefore, reflected in a corresponding decrease in anode to anode distributed capacity across the windings, and therefore in a radical extension upwards of the cut-off frequency of the amplifier, at its high end. Alternately, more turns may be employed in the primary windings, and the resultant increase of shunt capacity, due to increase in the number of turns, can be tolerated.

Audio amplifiers constructed in accordance with the present invention, and tested for distortion, have shown less than ½% distortion over the band 20 to 20,000 cycles, the conversion efficiency of the amplifier tubes remaining above 50% over the band, with an essentially flat response over the band of 20 to 200,000 cycles. Nevertheless, transformers constructed in accordance with the present invention inherently cost less to build than do transformers of the highest quality fabricated in accordance with prior art principles, and require less space and weigh less than the latter.

Further, no transformers currently available commercially or known to me are capable of attaining the wide frequency response and low wave form distortion attainable by the present system, regardless of their cost, weight or space.

The above and still further objects, advantages and features of the invention will become apparent upon consideration of the following detailed descriptions of various embodiments of the invention, especially when taken in conjunction with the accompanying drawings, wherein.

Figure 1:
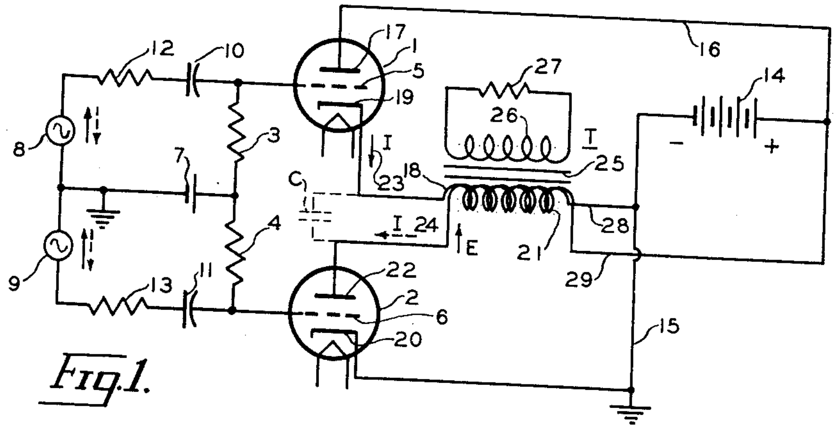
Figure 1 is a schematic circuit diagram of an embodiment of the invention wherein is employed a pair of bi-filarly wound primary windings in an output transformer having one of its coils connected in the cathode circuit of a vacuum tube of a push-pull amplifier, and the remaining coil connected in the anode circuit of the amplifier.

Referring now more particularly to the drawings and having reference particularly to Figure 1 thereof, there is illustrated a push-pull amplifier constructed in accordance with the principles of the present invention and utilizing an output transformer arranged in accordance with the invention.

The amplifier of Figure 1 is illustrated as employing a pair of triodes 1, 2 as amplifying electronic devices, the triodes 1 and 2 being provided respectively with grid leaks 3 and 4, which are connected between the control electrodes 5 and 6 of the triodes 1 and 2, respectively, the midpoint of the grid leak resistors 3 and 4 being grounded via a bias source 7. Driving potential is applied to the control electrodes 5 and 6 from sources conventionally illustrated as generators 8, 9, which may be presumed to provide potentials of opposite phases with respect to ground, and of suitable relative magnitudes, the potentials provided by the sources 8, 9 being applied to the control electrodes 5, 6 via coupling condensers 10 and 11 respectively, the resistors 12 and 13 representing the internal resistances of sources 8 and 9, respectively. The bias established by the bias source 7 may be such as to cause operation of the triodes 1 and 2 to be either as class A, class AB or class B amplifiers, the significance of the classification being well understood in the art, and defined by the Institute of Radio Engineers in its official definitions. While the circuits and structures of the present application have wide utility in amplifiers operating in accordance with any one of the above mentioned classifications, the invention has primary application to class B amplifiers, and will be described accordingly as utilized in amplifiers of this class, without intending thereby to limit the scope of the invention. For the purpose stated, the bias source 7 will be established to have a value such as to cut off the plate current of the triodes 1 and 2, in the absence of signal voltage applied to the grids thereof.

The input circuits of the triodes 1 and 2 will, accordingly, be seen to be completely conventional and to form essentially no part of the present invention.

A source of anode voltage 14 is provided, conventionally illustrated as a battery to simplify the drawings. The negative terminal of source 14 is grounded via the lead 15, and the positive terminal of source 14 is connected directly via the lead 16 to the anode 17 of the triode 1, the primary winding 18 of output transformer T being connected in the cathode lead of the triode 1, intermediate the cathode 19 thereof and the negative terminal of the potential source 14. The cathode 20 of the triode 2 is connected directly to ground and a further primary winding 21 of the output transformer T is connected between the positive terminal of the potential source 14 and the anode 22 of the triode 2.

The primary windings 18 and 21 are wound in bi-filar manner, or equivalently, as indicated in the schematic circuit diagram, the wires forming one of the windings being immediately adjacent the wires forming the other of the windings so that substantially zero leakage inductance exists as between the windings 18 and 21.

If it be assumed that a sine wave of potential is applied to the control electrodes 5, 6 by the sources 8, 9, the positive half of the sine wave deriving from source 8 effecting current transfer through the triode 1, and the positive half of the sine wave deriving from source 9 effecting current transfer through the triode 2, it will be apparent that while the positive half of the first mentioned sine wave is applied to the control electrode 5 that the triode 2 is cut off and that current flow through the primary winding 18 takes place in the direction of the arrow 23. On the other hand, while the positive half of the second mentioned sine wave is applied to the control electrode 6 of the triode 2, the triode 1 is cut off and current flow through the primary winding 21 takes place in the direction of the dotted arrow 24. Accordingly, with respect to the flux produced in the core 25 of the transformer T, current flow in the windings 18 and 21 is in opposite directions, so that an alternating magnetic flux is set up in the core 25, and an alternating voltage induced in the secondary winding 26 of the transformer T, for application to the load circuit conventionally illustrated as a resistance 27.

By virtue of the close coupling existing between the primary windings 18 and 21, the close coupling being brought about by the manner of winding the primary windings 18 and 21, substantially no leakage reactance will exist between these primary windings, and, accordingly, as explained in the article by Sah, cited hereinbefore, no transient effects will exist during change over of current carrying function from the triode 1 to the triode 2, and vice-versa. At the same time, the direction of the voltages E existing across both the windings 18 and 21 are always in identical direction, despite the fact that current flow in the two windings is in opposite sense because of the fact that the windings conduct in alternation and are closely coupled.

If we assume that the triode 2 is cut off, and the triode 1 conducting, for example, the winding 18 induces in the winding 21 a voltage congruent with its own voltage, and in the same sense in the two windings, the voltage in winding 21, however, being incapable of causing current flow in triode 2 because the input voltage applied to grid 6 is now negative in phase and of sufficient amplitude with respect to the voltage applied to the anode 22 of triode 2 by winding 21, to prevent such current flow. Precisely the same argument may be presented when triode 2 is conducting and triode 1 cut off.

Furthermore, the terminals 28 and 29 of the primary windings 18 and 21 are directly connected together via the potential source 14, which may be assumed to have zero impedance, and the total number of turns contained in the windings 18 and 21 and are precisely equal. Accordingly, no A.-C. potential difference exists between any two adjacent points of the windings 18 and 21, so that but slight or zero capacitive currents flow between adjacent turns of the primary windings 18 and 21. Such currents as do flow tend to maintain the potentials of adjacent points of the two primary windings 18 and 21 identical, and accordingly contribute to the proper functioning of the system.

A condenser C may, if desired, be connected directly from cathode 19 to anode 22 without altering the operation of the system essentially, but to assure the equi-potential relation between adjacent turns, particularly at the higher frequencies, where some leakage reactance might conceivably be present due to imperfections of the winding spacings.

It will be noted, upon close analysis, that, the triode 1 being cathode loaded and the triode 2 anode loaded, the former is subject to degeneration and the latter is not so subject. The gains of the triodes 1 and 2 are not equal, for that reason, and the input signals must be compensated accordingly. This feature of the system of Figure 1 detracts from its utility, in some degree.

Figure 2:
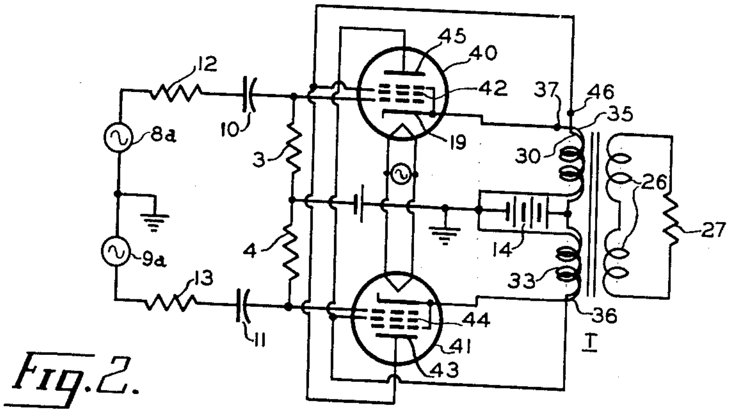
Figure 2 is a schematic circuit diagram illustrating a modification of the system illustrated in Figure 1 of the drawings, wherein the push-pull amplifier utilizes vacuum tubes having screen grids, each screen grid being maintained at a constant difference of potential with respect to its associated cathode during operation of the amplifier.

The circuit illustrated in Figure 2 of the drawings provides a solution to the problem of attaining maximum power conversion from pentode and tetrode tubes in cathode loaded push-pull amplifier circuits, arranged in accordance with the present invention, the solution consisting in connecting the screen grid 42 of one pentode 40 directly to the anode 43 of the other pentode 41, and the screen grid 44 of the other pentode 41 directly to the anode 45 of the first pentode 40. The connection of the screen grid 42 to the anode 43 implies connection of the screen grid 42 to the terminal 46 of the output transformer winding 30, which is maintained at the same A. C. potential as is the point 37 of the winding 35. Since the terminal 37 is always at the cathode potential of the pentode 40, likewise the terminal 46 of the winding 30 is maintained at the same A. C. potential as is the cathode of the pentode 40, the D. C. potential existing between the two points being, however, that provided by the potential source 14. Accordingly, as the cathode of the pentode 40 varies in potential, due to the presence in the cathode circuit of the current carrying winding 36, the potential of the screen grid 42 varies in precisely similar manner. The difference in potential is thus maintained constant, thereby maintaining maximum power conversion from the pentode.

A precisely similar explanation may be provided in connection with the pentode 41, this explanation, however, being sufficiently obvious.

It will be further realized that while I have disclosed tubes 40 and 41 as pentodes, that precisely the same principles and mode of operation and circuit connections may be employed in conjunction with the use of tetrodes, including beam power tubes, in the circuit of Figure 2.

Figure 3:
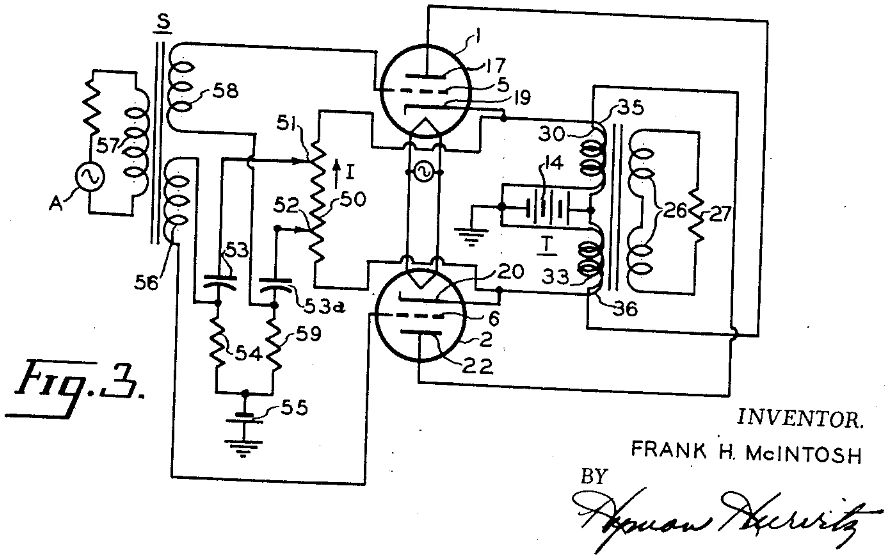
Figure 3 is a schematic circuit diagram of a modification of the system of Figure 2, wherein controllable degeneration is provided in the amplifier.

Reference is now made to Figure 3 of the drawings, which illustrates basically a system of the same character as that illustrated in Figure 2 of the drawings, there being added to the latter, however, controllable degenerative feed-back, still further to reduce the distortion of the amplifier, or in the alternative to necessitate reduced driving signal, as compared with the embodiments of Figure 2. In the system of Figure 3 of the drawings, controllable degenerative feed-back is derived by connecting across the primary windings 35 and 36, which are connected in the cathode leads of the triodes 1 and 2, a resistor 50, the latter then having developed across itself a voltage which is a replica of the output voltage available at the output of the transformer T. A pair of variable taps 51 and 52 are provided, taps 51 and 52 being located generally at points equidistantly located with respect to cathodes 20 and 19, respectively. Accordingly, by varying the positions of the taps 51 and 52 the total feed-back voltage to each of triodes 1 and 2 may be varied. The voltage deriving from the tap 51 is applied to contol electrode 6, via a coupling condenser 53, which is connected to one terminal of the secondary winding 56 of an input transformer S, which is supplied with exciting voltage via a primary winding 57 excited from the source of signal voltage A in conventional fashion. The remaining terminal of secondary winding 56 is connected to the control electrode 6 of the triode 2. While the control electrode 6 is being raised in potential and the tube 2 is conducting, the potential of the tap 51 decreases in potential due to current flow in resistor 50 in the direction of the arrow I, the cathode 20 of the triode 2 being then at higher potential than is the cathode 19 of the triode 1. In a similar manner, the tap 52 introduces a degenerative voltage into the grid of the triode 1 via a coupling condenser 53*a* which is connected in series with one terminal of the secondary winding 58 of the transformer S, the other terminal of winding 58 being connected to the control electrode 5 of the triode 1. Grid leaks for triodes 1 and 2 are provided by resistors 54 and 59, respectively connected in series with bias source 55.

It will be clear, then, that, by moving tap 51 to cathode 19, and tap 52 to cathode 20, zero degeneration will be introduced into the system, and that degenerative voltages having values as great as twice those normally available in the system of Figure 2 may be made available by establishing tap 51 at cathode 19, and tap 52 at cathode 20.

Figure 4:
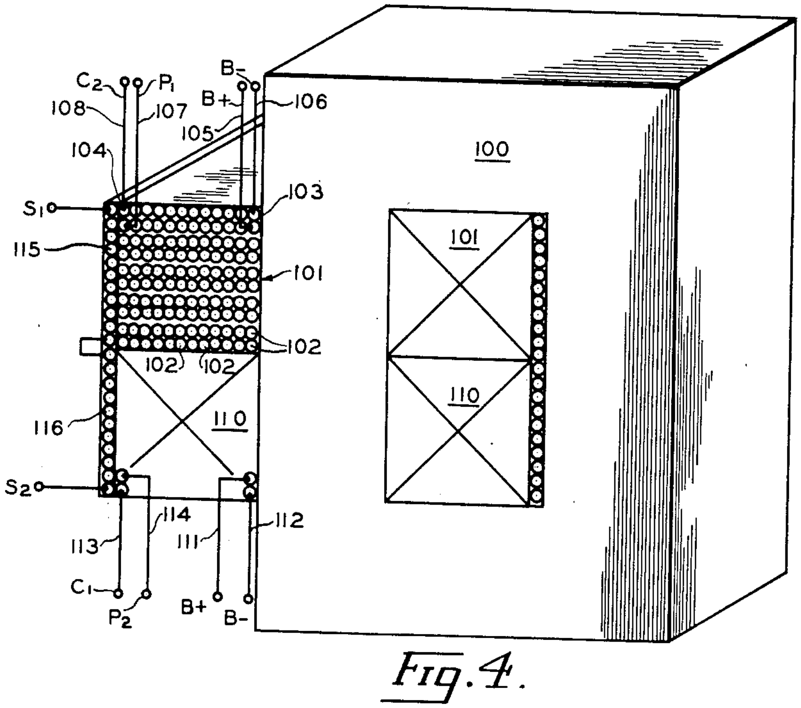
Figure 4 is a view, showing a transformer having bi-filarly wound primary windings for use in push-pull amplifiers arranged in accordance with the invention; and, Figures 5, 6 and 7 represent variations of the bi-filarly wound transformer of Figure 4.
Figure 5:
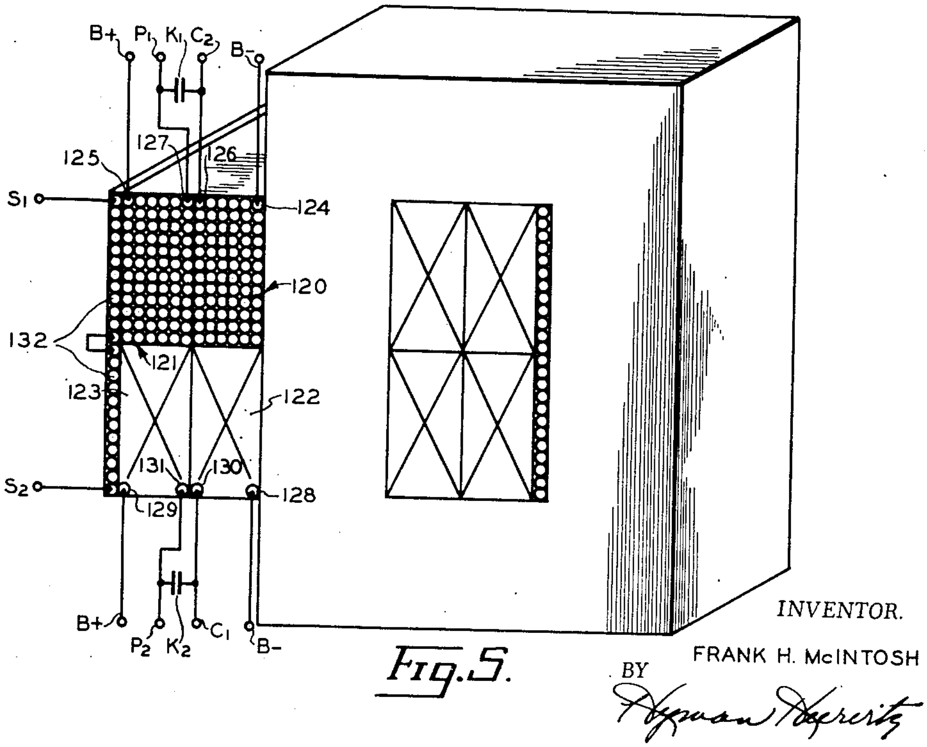
Figure 6:
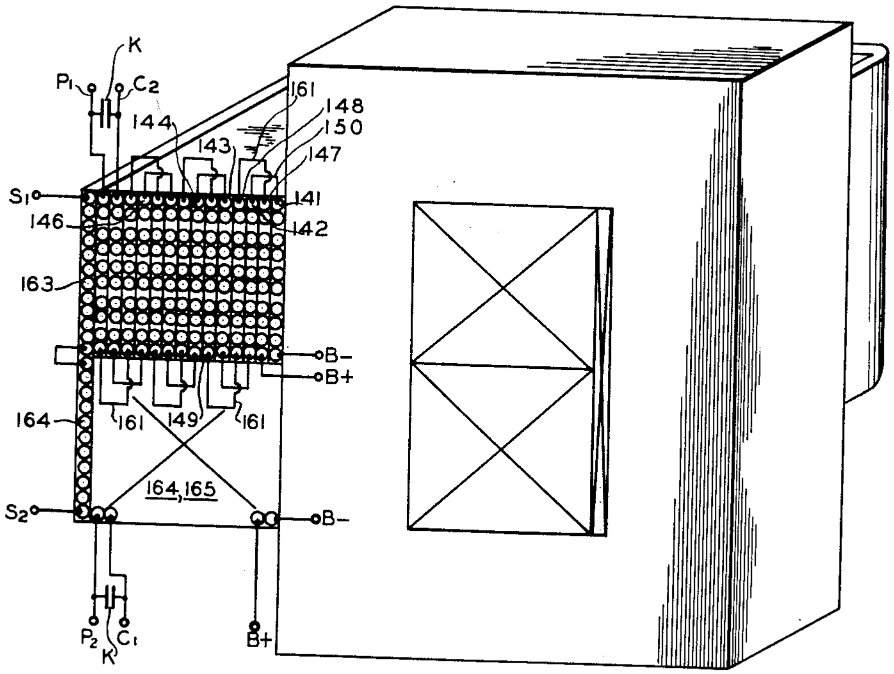
Figure 7:
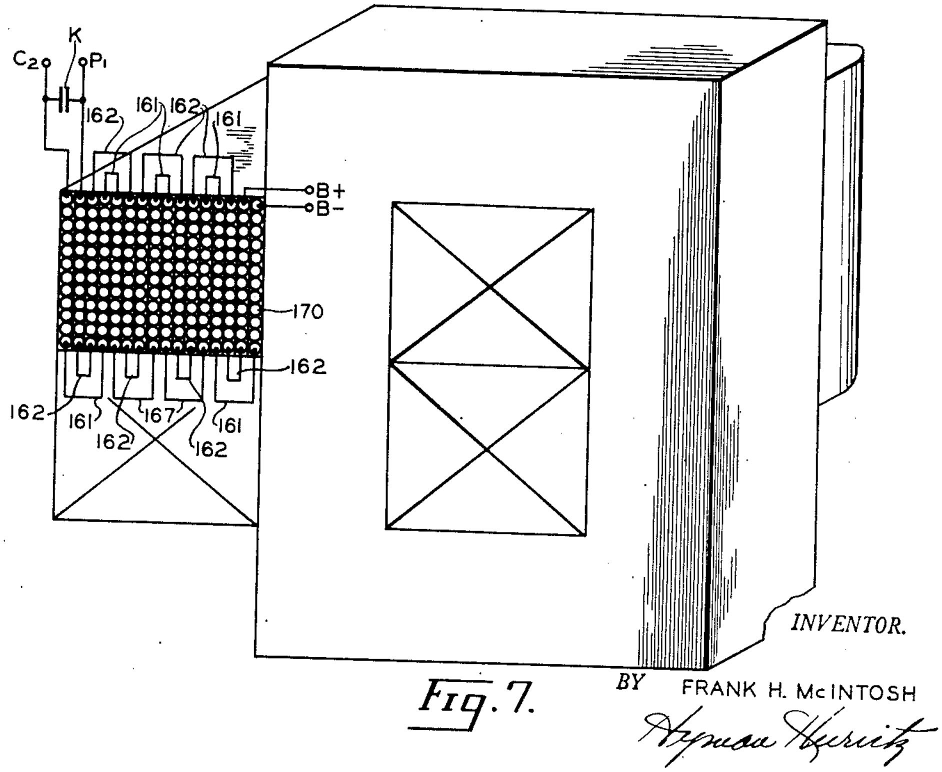

Reference is accordingly made to Figures 4 to 7 inclusive, of the drawings, wherein is illustrated a plurality of different transformer winding constructions which may be employed in the circuits of Figures 2, 3. Figure 4 illustrating a transformer having four primary windings, bi-filarly wound, and associated with a common secondary winding, Figure 5 illustrating a variant of the system of Figure 4 employing superposed coils in place of bi-filarly wound coils, the transformer of Figure 5 being in many respects equivalent to the transformer of Figure 4, when the windings are properly connected in a push-pull amplifier arranged in accordance with the invention. Figures 6 and 7 illustrate variants of the transformer of Figure 4 wherein separate layers of a single coil are incorporated by suitable interlayer connections in different primary windings of a push-pull transformer, providing a further approximate equivalent for a bi-filarly wound transformer.

Referring now more specifically to Figure 4 of the drawings, there is illustrated a core 100 of conventional structure having wound thereon a coil 101 formed of a plurality of bi-filarly wound layers 102, the winding commencing at point 103 and terminating at point 104. Leads 105, 106 are brought out from the commencement point 103 of the bi-filar winding, to which may be connected B+ and B− terminals of a voltage supply, when the transformer is connected in an amplifier circuit. Similarly from the end of the winding, at point 104, are brought out two terminals 107, 108, intended for connection, respectively, to the plate or anode P1 of one amplifier tube of a push-pull amplifier, and the cathode C2 of the remaining tube.

A duplicate coil 110 is wound on the same core beside the coil 107, having terminals 111 and 112 for connection respectively to B+ and B− terminals of the voltage supply, and terminals 113, 114 for connection respectively to the cathode C1 of the one tube and the anode P2 of the remaining tube.

It will be noted that the respective windings are wound in opposite winding senses with respect to the core 100, for reasons explained hereinabove, and briefly because the coils 101 and 110 are intended to produce flux in push-pull, or alternately in opposite directions in the core 100.

Secondary windings 115, 116 are superposed on the primary coils 101 and 110, respectively, and are shown connected in series by a lead 117, it being understood that parallel connection is equally feasible.

In the broadly or approximately equivalent system of Figure 5, bi-filar windings are dispensed with, and four primary windings are provided, numbered 120, 121, 122 and 123. The superposed windings 120 and 121 are wound in mutually identical sense, and the superposed windings 122 and 123 in identical sense, the latter two oppositely to the first mentioned two windings, and the winding pairs are arranged adjacently on the core. The initial point 124 of winding 120 may be connected to terminal B− and the terminating point 125 of winding 121 to terminal B+, of a plate voltage supply source, by appropriate terminals provided, and the terminal points 124 and 125 being thus joined by a path of negligible A.-C. impedance remain at identical A.-C. potential. The terminal point 126 of winding 120 and the initial point 127 of winding 121 are arranged to be in close juxtaposition, and are joined by a condenser K1, which serves to maintain the points 126 and 127 at identical A.-C. potentials.

The terminal point 126 may be connected to cathode C2 and the terminal 127 to anode P1.

The coil 122 may be similarly arranged, terminal 128 being connected to B−, terminal 129 of coil 123 to B+, and terminals 130 and 131 joined by a condenser K2, so that the terminals of pair 128, 129 and the terminals of pair 130, 131 are at identical A.-C. potentials. Terminal 130 may be connected to cathode C1 and terminal 131 to anode P2, of the tubes of the amplifier employing the transformer. The secondary winding 132 may be arranged as in the embodiment of Figure 4 of the drawings.

It will be realized that leakage inductance, in the case of the embodiment of my invention illustrated in Figure 5 will be greater than in the case of the embodiment of Figure 4. However, the transformer of Figure 5 may conceivably be more economically constructed than the transformer of Figure 4, and may prove desirable for that reason.

In Figure 6 of the drawings is illustrated a further modification of the system of Figure 4, wherein the effect of a bi-filar coil is attained by winding the respective primary windings which are desired to be unity coupled, in successive layers, and joining the layers thereafter by means of suitable leads. Having particular reference to a transformer suitable for use in the amplifier system of Figure 2, for example, the winding 29 may comprise the winding layers 141, 142, 143, 144, 145, 146, etc., and the winding 30 the alternate layers 147, 148, 149, 150, 151 . . . . The terminal point of layer 41 may be connected to B— and its other end point joined by lead 150 to an adjacent end point of layer 142, the layers 141 and 142 being wound in the same direction and current in each turn of both layers 141 and 142 flowing in the same sense, to produce mutually additive flux in the core. The process of layer interconnection is continued to the end of the winding, the winding layers 141, 142, 143 . . . being thus connected in series. The alternate layers, 147, 148, 149 . . . are likewise connected in mutual series relation by leads 161, and a secondary winding 163 may be superposed on the primary windings, in conventional fashion. The terminal points of the outermost pair of adjacent winding layers may then be brought out to anode P1 and cathode C2, respectively.

A similar pair of primary windings 164 and 165 may be provided on the core, adjacent to the primary windings 29 and 30, for connection to the anode P2 and the cathode C1, and with the windings 29 and 30 associated a further secondary winding 164, connected in series with secondary winding 163, it being understood that parallel connection is equally feasible.

It will be realized, since the windings are adjacent in alternate layers, and since the starting points of initial layers 141 and 147 are adjacent and inter-connected by a path of low impedance provided by the voltage source B+ and B—, that the potentials of adjacent turns of each pair of layers is ideally at identical A.-C. potential. To compensate for any departures from ideal conditions, brought about by winding irregularities and the like, I may inter-connect the ends of the windings by means of a large condenser K, which establishes the ends of the windings at identical A.-C. potential.

Figure 7 illustrates a winding sequence which approaches that of the sequence provided in the embodiment of Figure 6 of the drawings, the winding being laid in successive layers, 170 which are left mutually unconnected when the coil is wound. The first, fourth, fifth, eighth, ninth, twelfth . . . layers are connected in series by leads 161 to provide one winding; the second, third, sixth, seventh, tenth, eleventh . . . layers are connected in series by leads 162 to provide the other winding. The initial points of the first and second layers may be connected respectively to the B+ and B— terminals of a voltage supply, and the two outermost windings (the eleventh and twelfth layers of a twelve layer winding, for example), connected to the cathode, C2, of one vacuum tube and the anode, P1, of a further vacuum tube of a push-pull amplifier arranged in accordance with the invention. The latter two terminals may be connected across a condenser K to assure that the same A.-C. potential exists at these terminals, as in the transformer arrangements of Figures 5 and 6, inclusive. The upper windings may be duplicated to provide two pairs of bi-filarly wound equivalents.

It will further be realized, while the transformers illustrated in Figures 4, 6 and 7 approach relatively closely to the ideal, or bi-filarly wound transformer, that the embodiment of Figure 5 is at best a very rough approximation, and, while operative, operates but imperfectly in circuits arranged in accordance with the invention, and is not recommended except in cases where other considerations than excellence of performance are primary.

It will further be realized that further variants of the transformers illustrated in Figures 4, 6 and 7 may be resorted to without departing from the true scope and spirit of the invention, which requires the provision of unity coupled transformers, for best performance, and which may employ any type of unity coupled transformers having the requisite windings, and which are known or which may become known to the art.

While I have described various modifications of output transformers having bi-filarly wound primary windings, further modifications may be devised, and re-arrangements and modifications of the systems illustrated and described, resorted to, without departing from the true spirit and scope of the inventions, as defined in the appended claims.

What I claim and desire to secure by Letters Patent of the United States is:

1. A wide band audio transformer, comprising, a first primary winding, a second primary winding, a third primary winding, a fourth primary winding, a core of magnetic material, said first primary winding comprising a first strand of electrically conductive material wound on said core in a first winding sense, said second primary winding comprising a strand of electrically conductive material wound on said core in said first winding sense and in continuous juxtaposition to said first strand, said third primary winding comprising a third strand of electrically conductive material wound on said core in a sense opposite to said first winding sense, said fourth primary winding comprising a fourth strand of electrically conductive material wound on said core in continuous juxtaposition to said third strand, and at least one secondary winding wound on said core of magnetic material.

2. An audio transformer for transferring a band of signals over the spectrum 20–20,000 cycles with less than 1% distortion, comprising, a core of magnetic material, a first pair of bi-filarly wound windings linking with said core about one portion thereof, and wound in one winding sense, a second pair of bi-filarly wound windings linking with said core about a further portion thereof, and wound in an opposite sense and a secondary winding linking said core.

3. A wide band audio or video transformer, comprising, a magnetic core, a first center tapped primary winding having oppositely wound halves, a second center tapped primary winding having oppositely wound halves and bi-filarly related to said first winding, and a secondary winding coupled simultaneously to all said primary windings.

4. A wide band audio or video transformer, comprising, a first primary coil having two series connected first primary windings, each continuously wound in a different winding sense, a second primary coil having two series connected second primary windings each bi-filarly related to one of said first primary windings, means for connecting a source of D.-C. voltage between the junction of said first primary windings and the junction of said second primary windings.

5. A wide band audio transformer, comprising, a first primary winding, a second primary winding, a third primary winding, a fourth primary winding, a core of magnetic material, said first primary winding comprising a first strand of electrically conductive material wound on said core in a first winding sense, said second primary winding comprising a strand of electrically conductive material wound on said core in said first winding sense and in continuous juxtaposition to said first strand, said juxtapositioned first and second strands mutually insulated over their entire lengths, and wound in an even plurality of superposed helices, said third winding comprising a third strand of electrically conductive material wound on said core in a sense opposite to said first winding sense, said fourth primary winding comprising a fourth strand of electrically conductive material wound on said core in continuous juxtaposition to said third strand, said third and fourth strands mutually insulated over their entire lengths and wound in an even plurality of superposed helices, and at least one secondary winding wound on said core of magnetic material.

6. The combination in accordance with claim 5 wherein the terminations of said first and second strands, respectively, and said third and fourth strands, respectively, travel paths of identical diameter in each of said plurality of helices.

FRANK H. McINTOSH.

References Cited in the file of this patent

UNITED STATES PATENTS

| Number | Name | Date |
|---|---|---|
| 1,561,204 | Beers | Nov. 10, 1925 |
| 1,576,280 | Horelick | Mar. 9, 1926 |
| 1,616,200 | Shackelton | Feb. 1, 1927 |
| 1,781,308 | Vos | Nov. 11, 1930 |
| 1,809,839 | Field | June 16, 1931 |
| 2,132,875 | Myers | Oct. 11, 1938 |

FOREIGN PATENTS

| Number | Country | Date |
|---|---|---|
| 171,836 | Great Britain | Dec. 1, 1921 |